US011643941B2

(12) United States Patent
Guillotel et al.

(10) Patent No.: US 11,643,941 B2
(45) Date of Patent: May 9, 2023

(54) AIRCRAFT TURBINE ENGINE PROVIDED WITH AN ELECTRICAL MACHINE

(71) Applicant: SAFRAN AIRCRAFT ENGINES, Paris (FR)

(72) Inventors: Loïc Paul Yves Guillotel, Moissy-Cramayel (FR); Vincent François Georges Millier, Moissy-Cramayel (FR); Gilles Alain Marie Charier, Moissy-Cramayel (FR); Caroline Marie Frantz, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/287,399

(22) PCT Filed: Oct. 21, 2019

(86) PCT No.: PCT/FR2019/052499
§ 371 (c)(1),
(2) Date: Apr. 21, 2021

(87) PCT Pub. No.: WO2020/084240
PCT Pub. Date: Apr. 30, 2020

(65) Prior Publication Data
US 2021/0396149 A1    Dec. 23, 2021

(30) Foreign Application Priority Data
Oct. 26, 2018    (FR) ..................................... 1859944

(51) Int. Cl.
*F01D 15/12*    (2006.01)
(52) U.S. Cl.
CPC .......... *F01D 15/12* (2013.01); *F05D 2220/32* (2013.01); *F05D 2220/76* (2013.01)

(58) Field of Classification Search
CPC ....... F05D 2260/40311; F05D 2220/76; F05D 2220/32; F01D 15/10; F01D 15/12; F02C 7/32; F02C 7/36; B64D 2027/026
See application file for complete search history.

(56) References Cited

U.S. PATENT DOCUMENTS

| | | | | |
|---|---|---|---|---|
| 8,869,504 | B1 * | 10/2014 | Schwarz | .................. F02K 3/04 60/226.1 |
| 10,422,286 | B2 | 9/2019 | Le Pache et al. | |

(Continued)

FOREIGN PATENT DOCUMENTS

| | | |
|---|---|---|
| EP | 2337192 A2 | 6/2011 |
| FR | 3054264 A1 | 1/2018 |

OTHER PUBLICATIONS

International Search Report dated Feb. 5, 2020, issued in corresponding International Application No. PCT/FR2019/052499, filed on Oct. 21, 2019, and its English translation thereof, 2 pages.

(Continued)

*Primary Examiner* — Todd E Manahan
*Assistant Examiner* — David P. Olynick
(74) *Attorney, Agent, or Firm* — Christensen O'Connor Johnson Kindness PLLC

(57) ABSTRACT

An aircraft turbine engine includes a gas generator and a fan arranged upstream of the gas generator and configured to generate a main gas flow, of which one portion flows in a stream from the gas generator to form a primary flow, and of which another portion flows in a stream around the gas generator to form a secondary flow. The gas generator includes a low pressure body having a rotor driving the fan by means of a crown of a mechanical planetary reduction gear. The turbine engine further includes an electrical machine mounted coaxially around the reduction gear and having a rotor rotated by the crown of the reduction gear, (Continued)

and a stator extending around the rotor of the electrical machine.

11 Claims, 2 Drawing Sheets

(56) References Cited

U.S. PATENT DOCUMENTS

| | | | |
|---|---|---|---|
| 2004/0255590 A1 | 12/2004 | Rago et al. | |
| 2013/0023378 A1* | 1/2013 | McCune | F16H 1/28 |
| | | | 475/331 |
| 2014/0150401 A1 | 6/2014 | Venter | |
| 2016/0177770 A1* | 6/2016 | Adams | H02K 1/14 |
| | | | 290/46 |
| 2018/0073384 A1* | 3/2018 | Bordoni | F01D 19/00 |
| 2020/0340406 A1* | 10/2020 | Maljean | F01D 15/10 |
| 2021/0246835 A1* | 8/2021 | Garabello | F16H 3/44 |

OTHER PUBLICATIONS

Written Opinion of the International Searching Authority, dated Feb. 5, 2020, issued in corresponding International Application No. PCT/FR2019/052499, filed on Oct. 21, 2019, 5 pages.

* cited by examiner

AIRCRAFT TURBINE ENGINE PROVIDED WITH AN ELECTRICAL MACHINE

CROSS-REFERENCES TO RELATED APPLICATIONS

This application is a National Stage of International Application No. PCT/FR2019/052499 filed Oct. 21, 2019, which claims priority to French Patent Application No. 1859944, filed Oct. 26, 2018, the disclosures of which are hereby incorporated by reference in entirety.

TECHNICAL FIELD

The present invention relates to an aircraft turbine engine provided with an electrical machine.

BACKGROUND

The background comprises in particular the document FR-A1-3 054 264 which describes an aircraft turbine engine provided with an electrical machine.

The aeronautical world is now asking many questions about the relevance of using hybrid engines for commercial aviation. The use of electrical energy is now being considered not only to meet the needs of the aircraft but also to electrify the functions of the turbine engine.

This observation has led to the study of hybrid engine architecture solutions, combining fossil fuel energy and electrical energy to ensure the driving of the propulsion part (fan of the turbine engine) and the supply of certain engine and/or aircraft functions.

These architectures can be based on a high bypass ratio and a reduction gear type architecture, but also on a multiple body (2 or 3) architecture. In these architectures, the turbine engine comprises at least one low pressure body and one high pressure body, each body comprising a shaft connecting a rotor of a compressor to a rotor of a turbine.

It is known to equip an aircraft turbine engine with an electrical machine. It is recalled that an electrical machine is an electromechanical device based on electromagnetism allowing the conversion of electrical energy into mechanical energy, for example. This process is reversible and can be used to produce electricity from mechanical energy.

Thus, depending on the end use of a machine, we use the terms:
generator to designate an electrical machine producing electrical energy from mechanical energy,
motor for an electrical machine producing mechanical energy from electrical energy.

An electrical machine can also behave in motor mode as well as in generator mode.

The integration of a high-powered electrical machine on the low pressure body of a turbine engine, in particular of the high bypass ratio type, is very complex. Several installation zones are possible but the advantages and the disadvantages of each are numerous and diverse (problem of mechanical integration of the machine, temperature resistance of the machine, accessibility of the machine, etc.).

One of the major problems of integrating an electrical machine into a turbine engine is to have an environment capable of accepting the limited temperature of its components (around 150° C.). In addition, as the overall efficiency of the machine is necessarily less than 100%, the heat released by the losses must be evacuated. On machine sizes of more than 1 MW, the power dissipated is then significant (50 KW minimum). One solution would be to cool the stator of the machine with oil. However, if the machine is in an oil enclosure, the oil may leak directly into the enclosure with the risk of pollution by particles from the machine. If the machine is in a dry environment, then the cooling system must be sealed and it must be possible to recover any leaks. The oil cooling therefore has its disadvantages.

Other disadvantages concern dimensional aspects:
 In order to reduce the overall dimensions of an electrical machine, the aim is to increase the speed of rotation of its rotor, which however has, as an impact, a decrease of the torque of the machine;
 On the other hand, depending on the technology of the machine and its location, the speed of rotation may not exceed a certain value in order to avoid excessive peripheral speeds of the rotor which could lead to problems with the latter (detachment of the magnets, bursting, etc.).

The present invention offers a solution to at least some of the problems mentioned above.

SUMMARY OF THE INVENTION

The invention proposes an aircraft turbine engine, comprising a gas generator and a fan arranged upstream of the gas generator and configured to generate a main gas flow, part of which flows in a duct of the gas generator to form a primary flow, and another part of which flows in a duct around the gas generator to form a secondary flow, the gas generator comprising a low pressure body which comprises a rotor driving the fan by means of a ring gear of a mechanical reduction gear of the planetary type, the turbine engine further comprising an electrical machine, characterised in that the electrical machine is mounted coaxially around the reduction gear and comprises a rotor driven in rotation by the ring gear of the reduction gear, and a stator extending around the rotor of the electrical machine.

The present invention thus provides a solution for integrating an electrical machine, a first advantage being that, in the integration zone of this machine, the temperatures prevailing there are relatively low and therefore optimal for this machine. When the electrical machine is in motor operation, it adds torque to the reduction gear. In generator operation, it takes torque from the reduction gear to provide an electrical power. Thus, through the fan shaft, an energy is supplied to assist in the rotation of the fan.

The integration of the electrical machine around the reduction gear allows it to be positioned at a large radius value while rotating at the rotation speed of the fan. This provides an optimum peripheral speed at the air gap of the electrical machine, allowing the integration of a machine solution, such as a permanent magnet synchronous machine, which is still common practice today.

By integrating the electrical machine around the reduction gear, it is also possible to consider sharing the cooling of the reduction gear and the electrical machine. Indeed, the electrical machine needs a lot of cooling, just like the reduction gear.

This integration also allows:
 to limit the impact of the integration of such a machine on the motor length,
 to benefit from the inlet casing of the turbine engine to easily ensure the routing of the auxiliaries (pipes, harnesses, etc.) necessary for the operation of this electrical machine.

Furthermore, the present invention relates to a solution for integrating an electrical machine with an annular shape into a turbine engine comprising a reduction gear in planetary configuration. The present invention therefore proposes to drive an electrical machine through the planetary ring gear.

The turbine engine according to the invention may comprise one or more of the following characteristics, taken in isolation from each other or in combination with each other:
- the stator of the electrical machine is surrounded by an annular shroud internally bounding a flow duct of the primary flow,
- the turbine engine comprises an inlet casing which surrounds the reduction gear and the electrical machine, the stator of the electrical machine being attached to this inlet casing,
- the reduction gear comprises a planet carrier attached to the inlet casing,
- the stator of the electrical machine is attached to an upstream annular flange of said inlet casing, and the planet carrier of the reduction gear is attached to a downstream annular flange of the inlet casing,
- the rotor is integrated with or attached to the ring gear, which comprises an internal spur or herringbone toothing,
- the ring gear comprises a double helix herringbone toothing, the ring gear comprising two half-ring gears each comprising a helix, the rotor being integrated with or attached to one of the half-ring gears,
- the half-ring gears are attached to each other and to a downstream flange of an output shaft of the reduction gear, the upstream end of this output shaft being coupled to a shaft of the fan, and
- the reduction gear comprises a sun gear coupled by an input shaft to a main shaft of the low pressure body.

DESCRIPTION OF FIGURES

The invention will be better understood and further details, characteristics and advantages of the invention will become apparent from the following description made by way of non-limiting example with reference to the attached drawings, in which.

DETAILED DESCRIPTION

Figure 1:
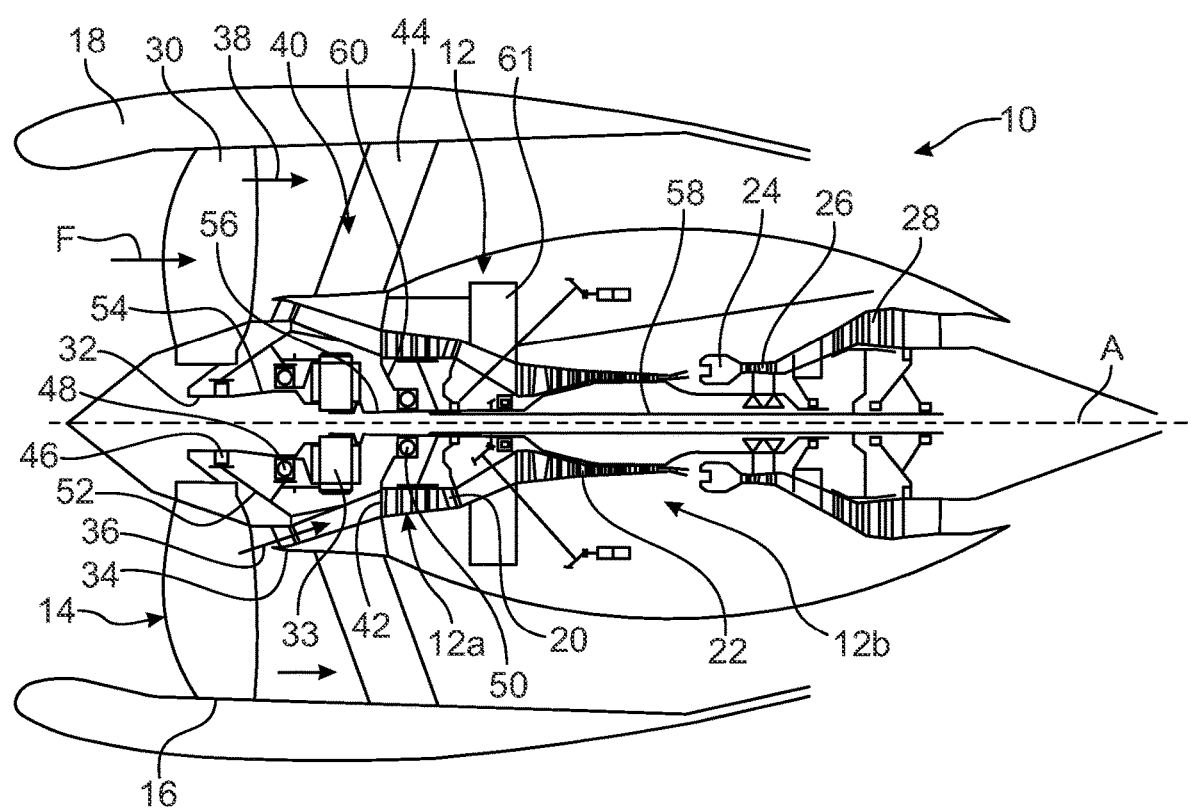
FIG. 1 is a schematic axial sectional view of an aircraft turbine engine with a high bypass ratio and reduction gear.

Reference is first made to FIG. 1 which schematically represents a double-body and double-flow aircraft turbine engine 10.

The turbine engine 10 conventionally comprises a gas generator 12 with a fan 14 upstream. The fan 14 is surrounded by a fan casing 16 which is surrounded by a nacelle 18 which extends around and along a major part of the gas generator 12.

The gas generator 12 comprises here two bodies, namely a low pressure body 12a or LP and a high pressure body 12b or HP. Each body comprises a compressor and a turbine.

The terms "upstream" and "downstream" are considered along a main direction F of gas flow in the turbine engine 10, this direction F being parallel to the longitudinal axis A of the turbine engine.

From upstream to downstream, the gas generator 12 comprises a low pressure compressor 20, a high pressure compressor 22, a combustion chamber 24, a high pressure turbine 26 and a low pressure turbine 28.

The low pressure compressor 20 and the high pressure compressor 22 are separated from each other by an intermediate casing 61.

The fan 14 comprises an annular row of vanes 30 driven in rotation by a fan shaft 32 which is connected to the rotor of the low pressure body 12a via a reduction gear 33. The gas flow which passes through the fan (arrow F) is separated upstream of the gas generator 12 by an annular nozzle 34 into a radially inner annular flow, referred to as primary flow 36 which supplies the gas generator 12, and a radially outer annular flow, referred to as secondary flow 38 which flows between the gas generator 12 and the nacelle 18 and provides most of the thrust of the turbine engine.

An inlet casing 40 structurally connects the gas generator 12 to the fan casing 16 and the nacelle 18. As with the intermediate casing 61, the inlet casing 40 comprises an annular array of radially inner arms 42 extending into the primary flow 36, and an annular array of radially outer guide vanes 44 (OGV type) extending into the secondary flow 38. The arms 42 are generally limited in number (less than ten) and are tubular and have auxiliaries passing through them. The number of vanes 44 (IGV) may be greater than 10.

The rotor of the low pressure body 12a and the fan shaft 32 are guided upstream by bearings 46, 48 and 50. These bearings 46, 48, 50 are of the ball or roller type and each comprise an inner bearing ring mounted on the shaft to be guided, an outer bearing ring carried by an annular bearing support and a bearing between the bearing rings.

The bearing 50 is carried by a bearing support 60 and allows to guide the input shaft 56 of the reduction gear 33. The bearings 46, 48 are carried by a bearing support 60 and allow to guide the output shaft 54 of the reduction gear 33.

The bearing supports 52, 60 extend around the axis A and are fixed parts connected to the stator and for example to the inlet casing 40.

Figure 2:
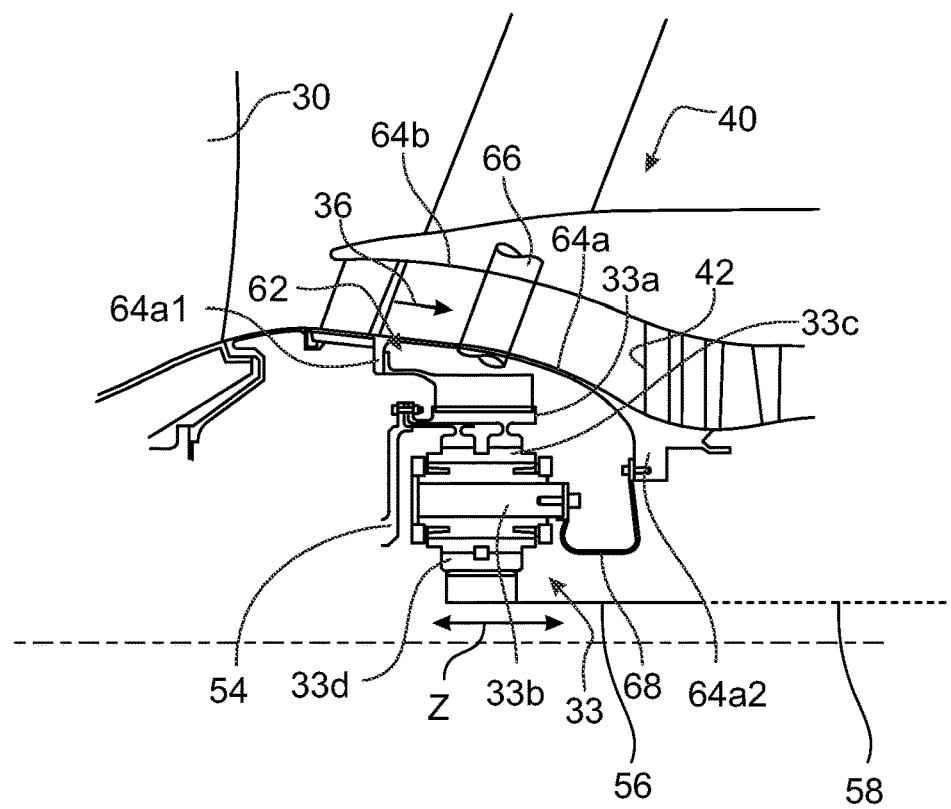
FIG. 2 is a partial schematic axial sectional half-view of an aircraft turbine engine according to the invention provided with an electrical machine.

FIG. 2 is a larger scale view of a part of a turbine engine and illustrates an installation zone of an electrical machine 62, this zone Z here being that of the reduction gear 33.

More precisely, the electrical machine 62 has a generally annular shape and its installation zone Z extends radially between the reduction gear 33 and the inlet casing 40 and more particularly between the ring gear 33a and the vanes 44.

The machine 62 comprises a rotor 62a and a stator 62b. The rotor 62a has a generally annular shape around the axis A and is secured in rotation with a ring gear 33a of the reduction gear 33. The stator 62a has a generally annular shape about the axis A. It extends around the rotor 62a and is secured with the inlet casing 40.

Figure 3:
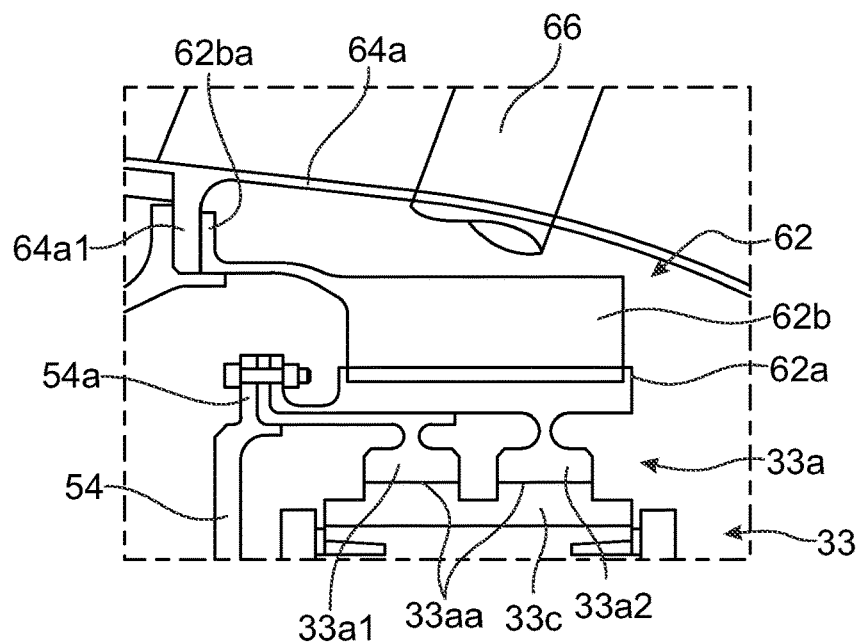
FIG. 3 is a larger scale view of a detail of FIG. 2.

The inlet casing 40 comprises two coaxial annular shrouds, respectively internal 64a and external 64b, which delimit between them the flow duct of the primary flow 36 and which are connected together by the aforementioned arms 42. The inner shroud 64a surrounds the electrical machine 62 and in particular its stator 62b and comprises a radially inner annular flange 64a1 for attachment of an upstream annular flange 62ba secured with the stator 62b (FIG. 3). In the example shown, the shroud 64a extends at a radial distance from the stator 62b but could be fitted to the stator, in particular so as to facilitate its cooling by thermal conduction, due to the sweeping of the shroud 64a by the primary flow 36 during operation.

The electrical machine 62 and in particular its stator 62b is connected to an electric cable 66 which passes through one of the tubular arms 42 of the inlet casing 40. This cable 66 enables to supply electricity to and control the electrical machine 62.

The reduction gear 33 is of the planetary type so that its ring gear 33a is rotatable and can drive the rotor 62a of the electrical machine 62.

The reduction gear 33 therefore has a stationary planet carrier 33b which is, for example, attached to the inlet casing 40. As can be seen in FIG. 2, the planet carrier 33b may be attached by a connecting member 68 to a downstream annular flange 64a2 of the inlet casing 40 or of its shroud 64a.

In the example shown, the ring gear 33a of the reduction gear 33 drives the fan and is of the type with internal herringbone toothing 33aa, i.e. a double helix. This internal toothing 33aa is intended to cooperate with a complementary external toothing of each satellite 33c of the reduction gear 33.

The ring gear 33a comprises two coaxial half-ring gears 33a1, 33a2, each comprising one of the helices of the internal toothing 33aa. These half-ring gears 33a1, 33a2 are arranged adjacent to each other and are connected to each other by radially outer annular flanges which are further attached to a radially outer annular flange 54a of the downstream end of the output shaft 54 of the reduction gear 33. The upstream end of this output shaft 54 is coupled to the fan shaft 32. The input shaft 56 of the reduction gear 33 is coupled to the sun gear 33d of the reduction gear and to the main shaft 58 of the low pressure body respectively.

The rotor 62a of the electrical machine 62 is attached to or integrated with one of the half-ring gears 33a1, 33a2, namely the one arranged downstream in the example shown.

In an alternative embodiment not shown, the ring gear 33a would comprise an internal spur toothing and be formed in one piece. The rotor of the electrical machine 62 would then be integrated or attached to this ring gear which would be attached to the flange 54a of the output shaft 54.

When the electrical machine 62 is in motor operation, it adds torque to the output of the reduction gear 33 so as to provide more power to the fan. One or more batteries may be installed in the aircraft and the electrical power is supplied to the electrical machine 62 via the electrical cable 64. This energy allows to rotate the rotor 62a of the electrical machine 62. The electrical energy is thus converted into mechanical energy. Via the fan shaft 34, an input of energy is supplied to assist in the rotation of the fan 14.

In generator operation, the electrical machine 62 draws torque from the reduction gear 33 to provide an electrical power. The torque is transmitted through the turbine shaft LP to the reduction gear 33 and transmitted to the fan 14 and to the electrical machine 62. The latter converts the mechanical energy into electrical energy to supply the aircraft's electrical network: storage, additional electrical propulsion, passenger equipment, cabin air conditioning, etc.

One of the sizing criteria for the electrical machines is the peripheral speed of the rotor (current values for a permanent magnet synchronous machine are less than 150 m/s, 200 m/s or even 250 m/s). However, in a turbine engine, the peripheral speeds of the various rotors can be beyond these limits. To reduce this peripheral speed, one can either reduce the radius where the air gap of the machine is positioned, or reduce the speed of rotation of the latter.

The integration of the electrical machine 62 around the reduction gear 33 allows it to be positioned at a large radius value while rotating at the speed of rotation of the fan. This allows a peripheral speed of 100 m/s at the air gap of the machine, for a given speed of rotation, thus allowing the integration of a machine solution, notably a permanent magnet synchronous machine.

By integrating the electrical machine around the reduction gear, it is also possible to consider sharing: the cooling of the reduction gear and the electrical machine, the oil supplies, the location of the oil returns (passages in the arms), the supply pumps, the oil circuit exchangers, etc.

This integration also allows to limit the impact of the integration of such a machine on the engine length, and enables to take advantage of the inlet casing to easily route the auxiliaries (pipes, harnesses, etc.) necessary for the operation of this electrical machine.

The invention claimed is:

1. An aircraft turbine engine, comprising: a gas generator and a fan arranged upstream of the gas generator and configured to generate a main gas flow, part of which flows in a first duct of the gas generator to form a primary flow, and another part of which flows in a second duct around the gas generator to form a secondary flow, the gas generator comprising a low pressure body which comprises a rotor driving the fan by a ring gear of a planetary mechanical reduction gear, the aircraft turbine engine further comprising an electrical machine mounted coaxially around the reduction gear, wherein the electrical machine comprises a rotor driven in rotation by the ring gear of the planetary mechanical reduction gear, and a stator extending around the rotor of the electrical machine, and wherein both the rotor and the stator of the electrical machine extend coaxially around the reduction gear.

2. The aircraft turbine engine according to claim 1, wherein the stator of the electrical machine is surrounded by an annular shroud internally bounding the first duct.

3. The aircraft turbine engine according to claim 1, further comprising an inlet casing which surrounds the planetary mechanical reduction gear and the electrical machine, wherein the stator of the electrical machine is attached to the inlet casing.

4. The aircraft turbine engine according to claim 3, wherein the mechanical planetary reduction gear comprises a planet carrier attached to the inlet casing.

5. The aircraft turbine engine according to claim 4, wherein the stator of the electrical machine is attached to an upstream annular flange of said inlet casing, and wherein the planet carrier of the mechanical planetary reduction gear is attached to a downstream annular flange of the inlet casing.

6. The aircraft turbine engine according to claim 1, wherein the rotor of the electrical machine is integrated with or attached to the ring gear, which comprises an internal spur or herringbone toothing.

7. The aircraft turbine engine according to claim 1, wherein the ring gear comprises a double helix herringbone toothing, the ring gear comprising two half-ring gears each comprising a helix, the rotor of the electrical machine being integrated with or attached to one of the half-ring gears.

8. The aircraft turbine engine according to claim 7, wherein the two half-ring gears are attached to each other and to a downstream flange of an output shaft of the mechanical planetary reduction gear, an upstream end of the output shaft being coupled to a shaft of the fan.

9. The aircraft turbine engine according to claim 1, wherein the mechanical planetary reduction gear comprises a sun gear coupled by an input shaft to a main shaft of the low pressure body.

10. An aircraft turbine engine, comprising: a gas generator and a fan arranged upstream of the gas generator and configured to generate a main gas flow, part of which flows in a first duct of the gas generator to form a primary flow, and another part of which flows in a second duct around the gas generator to form a secondary flow, the gas generator comprising a low pressure body which comprises a rotor driving the fan by a ring gear of a planetary mechanical reduction gear, the aircraft turbine engine further comprising an electrical machine mounted coaxially around the reduction gear, wherein the electrical machine comprises a rotor driven in rotation by the ring gear of the planetary mechanical reduction gear, and a stator extending around the rotor of the electrical machine, and wherein the ring gear comprises a double helix herringbone toothing, the ring gear comprising two half-ring gears each comprising a helix, the rotor of the electrical machine being integrated with or attached to one of the half-ring gears.

11. An aircraft turbine engine, comprising: a gas generator and a fan arranged upstream of the gas generator and configured to generate a main gas flow, part of which flows in a first duct of the gas generator to form a primary flow, and another part of which flows in a second duct around the gas generator to form a secondary flow, the gas generator comprising a low pressure body which comprises a rotor driving the fan by a ring gear of a planetary mechanical reduction gear, the aircraft turbine engine further comprising an electrical machine mounted coaxially around the reduction gear, wherein the electrical machine comprises a rotor driven in rotation by the ring gear of the planetary mechanical reduction gear, and a stator extending around the rotor of the electrical machine, wherein both the rotor and the stator of the electrical machine extend coaxially around the reduction gear, and wherein the electrical machine encloses the reduction gear.

* * * * *